Jan. 26, 1926.  
W. N. PORTER  
TIRE CHAIN TOOL  
Filed July 21, 1924

1,570,859

Inventor  
W. N. Porter  
By  
Lacey & Lacey, Attorneys

Patented Jan. 26, 1926.

1,570,859

UNITED STATES PATENT OFFICE.

WILLIAM N. PORTER, OF LEIGH, NEBRASKA.

TIRE-CHAIN TOOL.

Application filed July 21, 1924. Serial No. 727,253.

*To all whom it may concern:*

Be it known that I, WILLIAM N. PORTER, a citizen of the United States, residing at Leigh, in the county of Colfax and State of Nebraska, have invented certain new and useful Improvements in Tire-Chain Tools, of which the following is a specification.

My invention relates to a tool for stretching tire chains in assembling the same upon pneumatic tire wheels. It is a well-known fact that tire chains can be put on wheels only with great difficulty as they require considerable stretching in order to place them tightly in position. By the use of the present chain stretching tool, it is possible in a very short time to place the chains around the wheels even by a person not possessing a great deal of strength. The chains properly tightened in this manner cannot become detached from the wheels during the running of the car as is often the case when they are not put on sufficiently taut. Another advantage of the use of this tool is that with the chains stretched there will be no unnecessary noise when running the car as upon the chains striking against the back end of the running board. Still another advantage gained by the use of the tool is that both the chains and the tires will last longer as there will be less grinding and wear than if the chains fit loosely.

Figure 1:
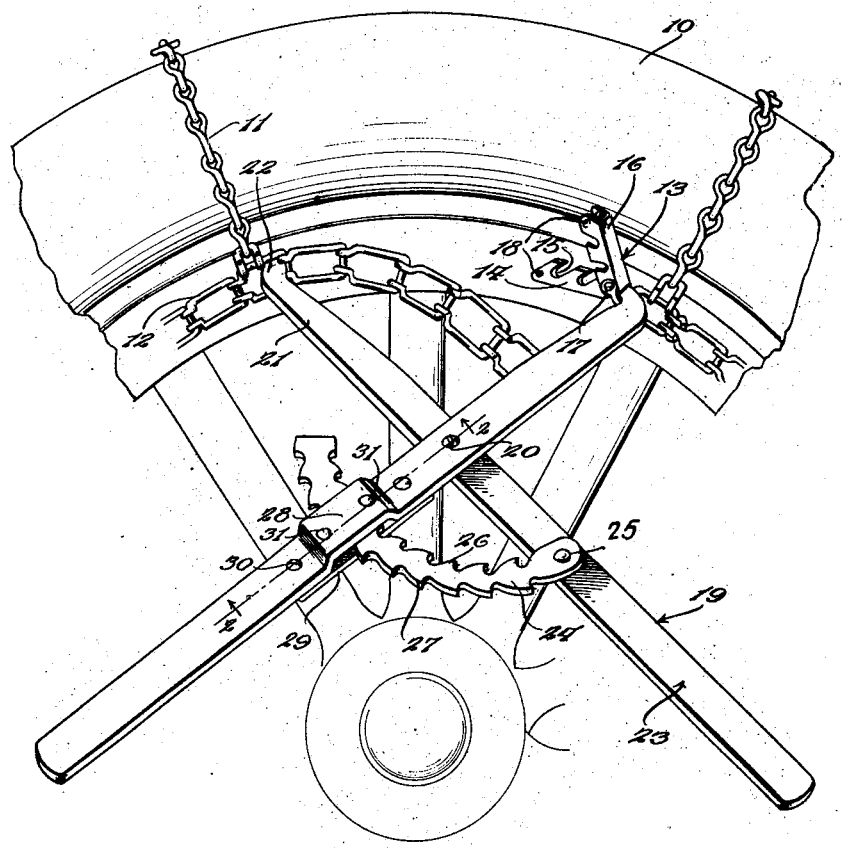
Figure 2:
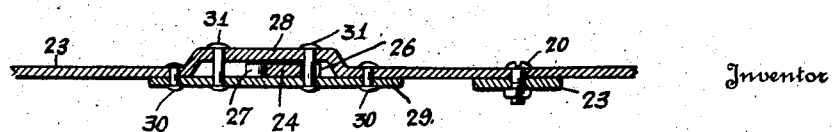

In the accompanying drawing, one embodiment of the invention is illustrated, and Figure 1 is a fragmentary side elevation of a vehicle wheel with the tool shown in position for tightening the chain;

Figure 2 is a section on the line 2—2 of Figure 1.

In the drawing, the reference numeral 10 represents a pneumatic tire of a vehicle wheel around which the chains are to be applied. The reference numeral 11 represents transverse short chains, while the numeral 12 represents the circumferential chains which may be of any suitable kind. One of the loose ends of the circumferential chains carries the usual locking device 13 which consists of a lower hook member 14 provided with a series of notches 15 for engaging a loose link of the other end of the chain. A cap member 16 of this device is hinged, as at 17, and adapted to close over the hook member 14 and be secured in position by means of a pin engaging in apertures 18.

The tool 19 is made in the shape of a pair of levers pivoted together, as at 20, and provided with two gripping jaws 21 terminating with inwardly bent fingers 22. The outer ends 23 of the levers provide operating arms for bringing the jaws together during the use of the tool. One of the operating arms 23 carries an arcuate rack bar 24 swiveled on the arm, as at 25. This latter member is provided with internal teeth 26 and exterior teeth 27 all pointing in the direction of the swiveled joint 25.

The other operating arm is bent to define a yoke 28 for the ratchet member 24, permitting slight oscillation of the ratchet member in the longitudinal direction of the arm. Extending across said yoke is a cap plate 29 secured to the arm by rivets 30 so that said plate thus braces the yoke as well as reinforces the arm at said yoke. Inserted through the yoke and through the cap plate are pins 31 between which the ratchet 24 may slide in and out. When pressed inwardly, the ratchet member will engage with one of its inner teeth 26, the innermost of the pins 31, while when pressed in the opposite direction one of the outer teeth 27 of the ratchet member will engage the outer pin 31 in a similar manner, thus locking the jaws 21 and preventing their opening. The reason for providing both inner and outer teeth on the ratchet member is that a close setting of the tool may be possible because the inner and outer teeth are placed in staggered relation to each other.

When a tire chain is to be put on, the hook of the inner one of the circumferential chains 12 is first locked in a suitable link and previous to placing the chain around the wheel. After the transverse chains have been drawn across the tire, the tool 19 is applied, as indicated in Figure 1. Care should then be taken that the fingers 22 engage links which are between the nearest transverse chains 11, or, in other words, the right-hand finger 22 should engage a link beyond the transverse chain 11, while the other finger 22 should similarly engage a link near the other transverse chain 11 so that none of the transverse chains will be positioned between the fingers when the tool is operated. The reason for this is that, if a transverse or cross chain 11 were placed between the fingers of the jaws, said cross chain will take up part of the slack and it would be difficult to properly stretch the circumferential chain 12. With the tool engaged as described, inward pressure is thereupon exerted on the operating arms 23 to bring the fingers 22 together as far as possible while, when no more stretching takes place, the rack bar 24 is made to engage with one of its teeth with the corresponding pin 31 to hold the tool while the locking device 13 is secured to the free end of the circumferential chain 12 and the cap 16 closed and secured on the lower member 14. As soon as the circumferential chain 12 has been secured in this manner, the rack bar 24 is loosened from the locking pin 31, whereupon the tool is removed from the chain.

In order to detach the chain from a wheel, the fingers 22 of the tool are again inserted in links of the chain to slacken the portion between them and release the locking device 13, whereupon the chain can be removed without difficulty from the wheel. It will be evident that, when using the tool forming the subject-matter of the present invention in putting on a tire chain, this can be done in much shorter time than is possible in the usual way so that a driver can be miles away from the place where he put on his tire chains while a person not provided with this tool will still be working to get his chains in place. With the chains applied very tight around the pneumatic tires, the chains are not liable to ruin or wear the tires as much as if they were loose, thus preventing tire puncture and other accidents.

Having thus described the invention, I claim:

In a tire chain tool, the combination of a pair of crossed flat pivotally connected levers provided at their forward ends with fingers to engage a tire chain, the rear end portion of one of said levers being bent to form a yoke, a plate secured to said lever to extend across said yoke bracing the yoke and reinforcing the lever, spaced pins extending transversely through said yoke and plate and rigidly supported at their ends thereby, and an arcuate rack bar pivoted upon the rear end portion of the other of said levers at the same side of said second mentioned lever with said first mentioned lever to lie in a plane with said first mentioned lever and extending through said yoke beneath said plate freely between said pins, each edge of the bar being provided with teeth to engage said pins respective for adjustably locking the rear ends of the levers against spreading movement and the teeth at each edge of the bar being staggered with respect to the teeth at the other edge of the bar to provide close spacing between the adjusted positions at which the levers may be locked.

In testimony whereof I affix my signature.

WILLIAM N. PORTER. [L. S.]